(12) United States Patent
Ware et al.

(10) Patent No.: US 10,992,171 B2
(45) Date of Patent: Apr. 27, 2021

(54) UNINTERRUPTIBLE POWER SUPPLY WITH WIRELESSLY CONFIGURABLE OPERATIONAL PARAMETERS

(71) Applicant: SCHNEIDER ELECTRIC IT CORPORATION, West Kingston, RI (US)

(72) Inventors: Gary R. Ware, Newton, MA (US); Flemming Johansen, Kolding (DK)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 16/408,612

(22) Filed: May 10, 2019

(65) Prior Publication Data

US 2019/0363571 A1 Nov. 28, 2019

Related U.S. Application Data

(60) Provisional application No. 62/676,301, filed on May 25, 2018.

(51) Int. Cl.
| | |
|---|---|
| *H04L 12/28* | (2006.01) |
| *G06F 1/00* | (2006.01) |
| *G06F 1/26* | (2006.01) |
| *G06F 3/00* | (2006.01) |
| *G06F 11/00* | (2006.01) |

(Continued)

(52) U.S. Cl.
CPC ............... *H02J 9/061* (2013.01); *G06F 1/30* (2013.01)

(58) Field of Classification Search
None
See application file for complete search history.

(56) References Cited

U.S. PATENT DOCUMENTS

| | | | |
|---|---|---|---|
| 7,082,541 B2* | 7/2006 | Hammond | ........... G06F 1/30 713/300 |
| 7,519,909 B2* | 4/2009 | Kuiawa | ........... G06F 3/04817 715/734 |

(Continued)

FOREIGN PATENT DOCUMENTS

JP  5223688 B2  6/2013

OTHER PUBLICATIONS

Extended European Search Report from corresponding European Application No. 19174820.1 dated Sep. 20, 2019.

*Primary Examiner* — Kenneth B Wells
(74) *Attorney, Agent, or Firm* — Lando & Anastasi, LLP (57) ABSTRACT

An Uninterruptible Power Supply (UPS) system includes a processor, an input coupled to an AC power source to receive input AC power, a converter circuit coupled to the input and configured to convert an input AC voltage to a DC voltage, an energy-storage component, a load output configured to provide output power derived from the DC voltage, and a radio-frequency circuit configured to receive a radio-frequency signal. The radio-frequency circuit includes an antenna and a memory. The memory stores instructions that, when executed by the processor, cause the processor to receive configuration data including a first UPS identifier from a component of the radio-frequency circuit. The instructions further cause the processor to compare the first UPS identifier to a second UPS identifier stored on a memory of the UPS system. The instructions further cause the processor to configure operation of the UPS system based on the configuration data.

17 Claims, 7 Drawing Sheets

(51) Int. Cl.
*H02J 9/06* (2006.01)
*G06F 1/30* (2006.01)

(56) References Cited

U.S. PATENT DOCUMENTS

| | | | | |
|---|---|---|---|---|
| 7,796,589 B2* | 9/2010 | Cohen | .................. | H04L 67/025 370/389 |
| 8,327,162 B2* | 12/2012 | Togashi | .................... | H02J 9/04 713/300 |
| 8,476,787 B2* | 7/2013 | Spitaels | ................. | H02J 9/062 307/64 |
| 8,639,953 B2* | 1/2014 | Spitaels | ................ | G05B 15/02 713/300 |
| 8,674,823 B1* | 3/2014 | Contario | ............. | G01R 19/145 340/538 |
| 9,847,672 B2* | 12/2017 | Fallon | ....................... | H02J 9/06 |
| 2003/0033548 A1* | 2/2003 | Kuiawa | ................... | G06F 1/30 713/300 |
| 2005/0216578 A1* | 9/2005 | Thompson | ......... | H04L 41/0681 709/223 |
| 2009/0126008 A1 | 5/2009 | Fuchik et al. | | |
| 2012/0262281 A1 | 10/2012 | Edwards et al. | | |

\* cited by examiner

UNINTERRUPTIBLE POWER SUPPLY WITH WIRELESSLY CONFIGURABLE OPERATIONAL PARAMETERS

CROSS-REFERENCE TO RELATED APPLICATIONS

This application for patent claims the benefit of priority to and hereby incorporates by reference U.S. Provisional Application No. 62/676,301, entitled "Systems and Methods for Late Differentiation of Network Nodes," filed May 25, 2018.

TECHNICAL FIELD

The present disclosure provides an Uninterruptible Power Supply with configurable operational parameters. In particular, in some embodiments, the Uninterruptible Power Supply may comprise operational parameters that may be configured wirelessly.

BACKGROUND

Power devices, such as Uninterruptible Power Supply (UPS) systems, provide regulated, uninterrupted power for sensitive and/or critical loads (e.g., computer systems and/or other data processing systems) when an input power source, such as a utility mains, fails. Distributors and installers of UPS systems may have multiple systems stocked under the same product number (e.g., a stock keeping unit (SKU) number or UPC (Universal Product) number) even though the systems are intended to operate differently. For example, a first UPS system may be intended to deliver power to a maximum load of 80 kW whereas a second system may be intended to deliver to a maximum load of 100 kW. This may occur when a first customer purchases the first UPS at a lower price than a second customer purchasing the second UPS. Despite the different operation intended for the multiple UPS systems, a distributor or installer may nevertheless choose to stock the UPS systems under a single product number. Doing so allows the distributor or installer to avoid predicting what quantity of each type of UPS must be stocked. This allows the distributor or installer to avoid being understocked or overstocked. Similarly, the manufacturer of the UPS systems may find it economical to manufacture multiple UPS systems capable of operating at the highest level (e.g., highest maximum output power) but to then limit the level of operation of a particular UPS based on the level of operation a customer purchased for the UPS. Doing so allows the manufacturer to avoid predicting what quantity of each type of UPS must be manufactured. Further, UPS systems may have different components designed to facilitate different operation. As in the previous example, the first UPS may have components that are not rated to deliver more than 80 kW whereas the second UPS may have components rated to deliver up to 100 kW. A distributor or installer may choose to keep the two UPS systems stocked under a single product number for the sake of convenience, as tracking the stock of multiple product numbers is more difficult than tracking a single product number. Power devices, such as Uninterruptible Power Supply (UPS) systems, provide regulated, uninterrupted power for sensitive and/or critical loads (e.g., computer systems and/or other data processing systems) when an input power source, such as a utility mains, fails. Distributors and installers of UPS systems may have multiple systems stocked under the same product number (e.g., a stock keeping unit (SKU) number or UPC (Universal Product) number) even though the systems are intended to operate differently. For example, a first UPS system may be intended deliver power to a maximum load of 80 kW whereas a second system may be intended to deliver to a maximum load of 100 kW. This may occur when a first customer purchases the first UPS at a lower price than a second customer purchasing the second UPS. Despite the different operation intended for the multiple UPS systems, a distributor or installer may nevertheless choose to stock the UPS systems under a single product number. Doing so allows the distributor or installer to avoid predicting what quantity of each type of UPS must be stocked. This allows the distributor or installer to avoid being understocked or overstocked. Similarly, the manufacturer of the UPS systems may find it economical to manufacture multiple UPS systems capable of operating at the highest level (e.g., highest maximum output power) but to then limit the level of operation of a particular UPS based on the level of operation a customer purchased for the UPS. Doing so allows the manufacturer to avoid predicting what quantity of each type of UPS must be manufactured. Further, UPS systems may have different components designed to facilitate different operation. As in the previous example, the first UPS may have components that are not rated to deliver more than 80 kW whereas the second UPS may have components rated to deliver up to 100 kW. A distributor or installer may choose to keep the two UPS systems stocked under a single product number for the sake of convenience, as tracking the stock of multiple product numbers is more difficult than tracking a single product number.

SUMMARY

Consistent with disclosed embodiments, an Uninterruptible Power Supply (UPS) system may comprise a processor; an input coupled to an AC power source to receive input AC power; a converter circuit coupled to the input and configured to convert an input AC voltage to a DC voltage; an energy-storage component; a load output configured to provide output power derived from the DC voltage; a radio-frequency circuit configured to receive a radio-frequency signal, the radio-frequency circuit comprising an antenna; and a memory. The memory may store instructions that, when executed by the processor, cause the processor to receive configuration data from a component of the radio-frequency circuit, the configuration data comprising a first UPS identifier; compare the first UPS identifier to a second UPS identifier, the second UPS identifier stored on a memory of the UPS system; and configure operation of the UPS system based on the configuration data. The processor may configure operation of the UPS system based on the configuration data in response to the comparison of the first UPS identifier to a second UPS identifier resulting in a match. Comparing the first UPS identifier to the second UPS identifier may comprise decrypting the configuration data. The first UPS identifier may be a first serial number and the second UPS identifier may be a second serial number. The antenna may be configured to receive the configuration data over an Ultra High Frequency Radio Frequency Identification communication protocol. The radio-frequency circuit may comprise a passive data storage. The radio-frequency circuit may comprise the processor. The radio-frequency circuit may comprise the memory.

Consistent with disclosed embodiments, a non-transitory computer-readable medium may store a set of instructions that may be executed by at least one processor to perform a method for configuring operational parameters of an Uninterruptible Power Supply (UPS). The method may comprise receiving configuration data from a component of a radio-frequency circuit, wherein the radio-frequency circuit may be configured to receive a radio-frequency signal and the configuration data comprises a first UPS identifier; comparing the first UPS identifier to a second UPS identifier, the second UPS identifier stored on a memory of a UPS system; and configuring operation of the UPS system based on the configuration data. The method may further comprise configuring operation of the UPS system based on the configuration data in response to the comparison of the first UPS identifier to a second UPS identifier resulting in a match. Comparing the first UPS identifier to the second UPS identifier may comprise decrypting the configuration data. The first UPS identifier may be a first serial number and the second UPS identifier may be a second serial number. The radio-frequency circuit may comprise a passive data storage. The radio-frequency circuit may comprise the at least one processor. The radio-frequency circuit may comprise the non-transitory computer-readable medium.

Consistent with disclosed embodiments, a non-transitory computer-readable medium may store a set of instructions that may be executed by at least one processor to perform a method for wirelessly configuring operational parameters of an Uninterruptible Power Supply (UPS), the method comprising: receiving, on a radio-frequency device, a first UPS identifier associated with a UPS system; transmitting the first UPS identifier over a network; receiving configuration data associated with the UPS system in response to transmitting the first UPS identifier, the configuration data specifying one or more operational parameters of the UPS system; and transmitting the configuration data to the UPS system over a wireless-communication protocol. The method may further comprise receiving a confirmation indicating that the configuration data was received by the UPS system. The configuration data may be encrypted. The method may further comprise receiving, on the radio-frequency device, a second UPS identifier associated with the UPS system; comparing the first UPS identifier with the second UPS identifier; and outputting a notification if the comparison does not result in a match. The method may further comprise receiving a confirmation from the UPS system indicating that a second UPS identifier transmitted as a portion of the configuration matches a third UPS identifier stored on a memory of the UPS system.

The foregoing general description and the following detailed description are exemplary and explanatory only and are not restrictive of the claims.

Other objects and features will be in part apparent and in part pointed out hereinafter.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments and are incorporated in and constitute a part of this specification but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION OF THE EMBODIMENTS

In view of the shortcomings of current systems and methods, improved systems and methods for providing the same are desired.

UPS distributors and installers may seek to manually configure aspects of a UPS's operation based on a customer's order, but configuring the UPS may be difficult if the UPS is not easily accessible. As an example, it may be difficult to configure a UPS if it is enclosed in its original packaging or is installed in a server rack because it may need to be removed from the packaging or rack. Removing the UPS from the packaging or server rack is time-consuming, requires training, and risks injury and damage to the UPS or other customer equipment.

As described in further detail herein, exemplary embodiments disclosed herein are directed to an Uninterruptible Power Supply (UPS) with wirelessly configurable operational parameters. In this context, operational parameters may be data stored in memory located on the UPS that specifies how the UPS is to operate. Maximum power output (i.e., capacity), length of backup-power provisioning (i.e., runtime), output voltage, output frequency, peak-shaving settings, redundancy settings, logo displays (e.g., indicating the grant of a certification of energy efficiency by an agency), cloud-service provisioning, energy-storage selection (e.g., valve-regulated lead-acid battery, Lithium-ion battery, or flywheel energy storage), and pure-sinewave or simulated-sinewave output are examples of operational parameters that may be configured (e.g., enabled or disabled). A UPS's operational parameters may be configured by loading configuration data into a memory of the UPS. The UPS may have a radio-frequency circuit configured to receive the configuration data via a radio-frequency signal. A user may use an RFID reader/writer, a smartphone, barcode scanner with wireless-communication capabilities, or another optical and/or radio-frequency device to determine a serial number of an unconfigured UPS, send the serial number to a customer-order database to retrieve corresponding configuration data, and transmit the configuration data wirelessly to the UPS's radio-frequency circuit. The configuration data may be transmitted wirelessly to the UPS while the UPS is in its original packaging or installed in a location that is difficult to access (e.g., a server rack). Wireless configuration of the UPS may allow a user to stock and/or manufacture a single type of UPS and stock it under a single product number without needing to unpackage the UPS or remove it from an installed location to configure it by cable.

While wireless configurability offers advantages, it may expose the UPS to security risks if the system is not properly implemented. Encryption may be used to achieve enhanced security, which may include providing customers purchased features and functions.

While a distributor configures the UPS in the examples below, it is to be understood that other types of users may seek to configure the UPS (e.g., a manufacturer or installer).

Reference will now be made in detail to exemplary embodiments, examples of which are illustrated in the accompanying drawings and disclosed herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Figure 1:
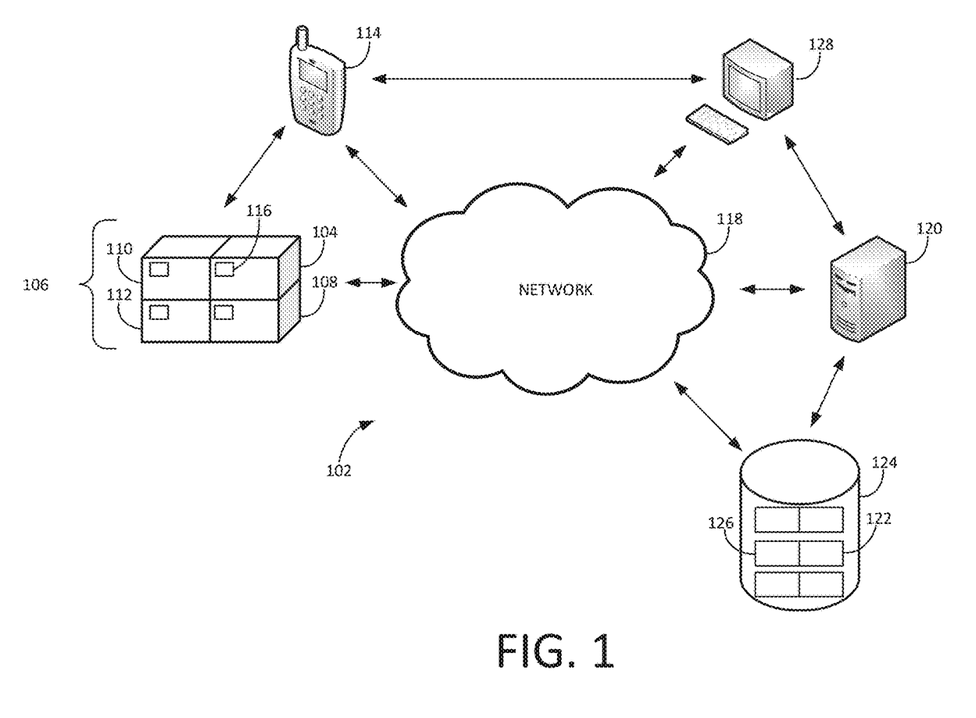
FIG. 1 is a diagram of an exemplary system environment within which an exemplary Uninterruptible Power Supply may have its operational parameters configured wirelessly.

FIG. 1 is a diagram of an exemplary system environment 102 within which an exemplary UPS 104 may have its operational parameters configured. UPS 104 may be stocked by itself or as part of pallet 106. Pallet 106 may comprise multiple UPS systems, such as UPS 104, UPS 108, UPS 110, and UPS 112. A distributor may use a radio-frequency device ("RF device 114")—such as an RFID reader/writer, smartphone, or barcode scanner—to receive a UPS identifier associated with UPS 104. For example, a camera on an RF device 114 may be used to scan barcode 116 on UPS 104 or its packaging. Barcode 116 may be a QR code or another scannable or capturable image or text. The data encoded in barcode 116 may comprise the UPS identifier associated with UPS 104. In some embodiments, the UPS identifier may be read from a radio-frequency circuit in UPS 104. The UPS identifier may be a serial number associated with UPS 104. The UPS identifier may be assigned to UPS 104 and stored in its memory (e.g., read-only memory) during manufacturing. The UPS identifier may be unique to UPS 104 (i.e., UPS 104 may be the only UPS to have the UPS identifier assigned to it). RF device 114 or another component may transmit the UPS identifier over network 118 or directly to server 120. Server 120 may be running an application that uses the received UPS identifier to retrieve configuration data 122. Configuration data 122 may be used to configure operational parameters of UPS 104. Configuration data 122 may be stored in database 124 (e.g., a customer-order database) in association with UPS identifier 126. Server 120 may transmit the retrieved configuration data 122 and transmit it to RF device 114. In some embodiments, this may occur automatically. In some embodiments, a distributor may manually connect RF device 114 to computer system 128, server 120, and/or database 124 and select the appropriate configuration data 122 to be transferred to RF device 114. RF device 114 may receive configuration data 122 and transmit it to UPS 104. RF device 114 may transmit configuration data 122 to UPS 104 over a wireless-communication protocol (e.g., a Near-field Communication (NFC) or an Ultra High Frequency (UHF) protocol using Radio Frequency Identification (RFID)). In some embodiments, UPS 104, after receiving configuration data 122, may transmit a confirmation indicating that configuration data 122 was received by UPS 104. The confirmation may be transmitted over a wireless-communication protocol. RF device 114 may receive the confirmation. RF device 114 may supply power via electromagnetic induction to UPS 104. In some embodiments, RF device 114 may run the application for retrieving configuration data 122 from database 124.

In some embodiments, distributors may confirm that a UPS to which they will transmit configuration data 122 is the same UPS for which they received configuration data 122. This may be desirable, for example, to avoid writing configuration data 122 intended for UPS 104 onto another UPS (e.g., UPS 112). Before transmitting configuration data 122 to a UPS the distributor believes is UPS 104, the distributor may use RF device 114 to scan barcode 116 on the UPS and receive a second UPS identifier. The second UPS identifier may be compared to the UPS identifier previously received and used to retrieve configuration data 122. This comparison may be performed by RF device 114, a computer system 128, or server 120. If the comparison does not result in a match, a notification of a mismatch may be outputted by RF device 114. In some embodiments, a notification may be outputted in the event of a match.

In some embodiments, UPS 104 may have the capability to confirm that received configuration data 122 is associated with UPS 104 before configuration of its operational parameters begins. The radio-frequency circuit of UPS 104, discussed in more detail below with respect to FIG. 5, may be powered wirelessly using, for example, electromagnetic induction. The transferred energy may be used to read a memory of UPS 104 that stores instructions that, when executed by a processor, cause UPS 104 to confirm that received configuration data 122 is associated with UPS 104. UPS 104 may parse configuration data 122 to extract a first UPS identifier (e.g., a serial number) and compare it with a second UPS identifier, which may be stored on a memory of UPS 104. In the event of a match, UPS 104 may transmit a confirmation indicating that the UPS identifier transmitted as a portion of configuration data 122 matches the UPS identifier stored on the memory of UPS 104. RF device 114 may receive this confirmation.

RF device 114 may transmit the UPS identifier to computer system 128 and receive configuration data 122 from computer system 128. Some processes described with respect to RF device 114 may be performed by computer system 128 in conjunction with RF device 114. RF device 114 may communicate with computer system 128, server 120, and/or database 124 directly or over network 118. Components in system environment 102 may communicate with other components in system environment 102 directly or over network 118.

In some embodiments, configuration data 122 may be encrypted. For example, configuration data 122 may be transmitted to UPS 104 in an encrypted format. Encrypting configuration data 122 may prevent malicious actors from reading configuration data 122 and creating different configuration data that, when loaded into UPS 104, will cause it to operate in a manner not intended by the manufacturer, distributer, or installer. For example, a malicious actor may attempt to create configuration data that, when loaded into UPS 104, causes it to operate at a higher maximum output power than purchased at UPS 104 system's time of sale. At least a portion of configuration data 122 may comprise the UPS identifier associated with the UPS for which the configuration data 122 is intended. This may prevent a malicious actor from copying configuration data 122 and loading it into a UPS for which the configuration data was not intended. For example, UPS 104, when powered up, may decrypt the received configuration data 122 and parse it to extract the UPS identifier (e.g., a serial number). UPS 104 may compare it with a UPS identifier (e.g., a serial number) stored on a memory of UPS 104. If UPS 104 detects a match between the UPS identifier received as part of the configuration data 122 and the stored UPS identifier, UPS 104 may proceed to configure its operational parameters based on the configuration data 122. UPS 104 may output an indication notifying a user of the match. If a mismatch is detected, UPS 104 may cease operation or operate using operational parameters that differ from those specified by configuration data 122. UPS 104 may output an indication notifying a user of the mismatch. Instead or in addition, UPS 104 may check whether the operational parameters specified by configuration data 122 would force UPS 104 to operate beyond its operational capabilities (e.g., set a maximum power output of 100 kW when UPS 104 has components that can provide a maximum power output of 80 kW). When operational parameters specified by configuration data 122 would force UPS 104 to operate beyond its operational capabilities, UPS 104 may cease operation or operate using operational parameters that differ from those specified by configuration data 122. UPS 104 may output an indication notifying a user of the UPS's incompatibility with the operational parameters prescribed by configuration data 122. Instead or in addition, UPS 104 may check whether the operational parameters specified by configuration data 122 would force UPS 104 to operate within its operational capabilities. When operational parameters specified by configuration data 122 would force UPS 104 to operate within its operational capabilities, UPS 104 may proceed to operate using operational parameters specified by configuration data 122. UPS 104 may output an indication notifying a user of the UPS's compatibility with the operational parameters prescribed by configuration data 122.

The encryption method used may be symmetric (e.g., Advanced Encryption Standard-256) or asymmetric (e.g., elliptic-curve cryptography). In the case of symmetric encryption, the manufacturer (or other entity encrypting configuration data 122) may use the same key to encrypt as will be stored on UPS 104 for decryption. In the case of asymmetric encryption, the manufacturer (or other entity encrypting configuration data 122) may use one private key for encrypting configuration data 122 and UPS 104 may have a public key—different from the private key—that is uniquely capable of decrypting configuration data 122.

Computer system 128 may be used to print a label for UPS 104 that specifies, for example, a model number, description, etc., based on configuration data 122. For example, computer system 128 may receive configuration data 122 from server 120, database 124, or RF device 114, and print the label based on configuration data 122. In some embodiments, computer system 128 may decrypt configuration data 122 before reading the data and creating the label.

System components in FIG. 1 may be arranged as desired. Network 118 may be a wired and/or wireless network that uses, for example, physical and/or wireless data links to carry network data among (or between) network components. Network 118 may support voice, push-to-talk (PTT), broadcast video, and/or network data communications by network components. Wireless network protocols can include, for example, MBMS, CDMA, 1xRTT, GSM, UMTS, HSPA, EV-DO, EV-DO rev. A, 3GPP LTE, WiMAX, etc. Wired network protocols can include, for example, Ethernet, Fast Ethernet, Gigabit Ethernet, Local Talk (such as Carrier Sense Multiple Access with collision Avoidance), Token Ring, FDDI, ATM, etc.

Figure 2:
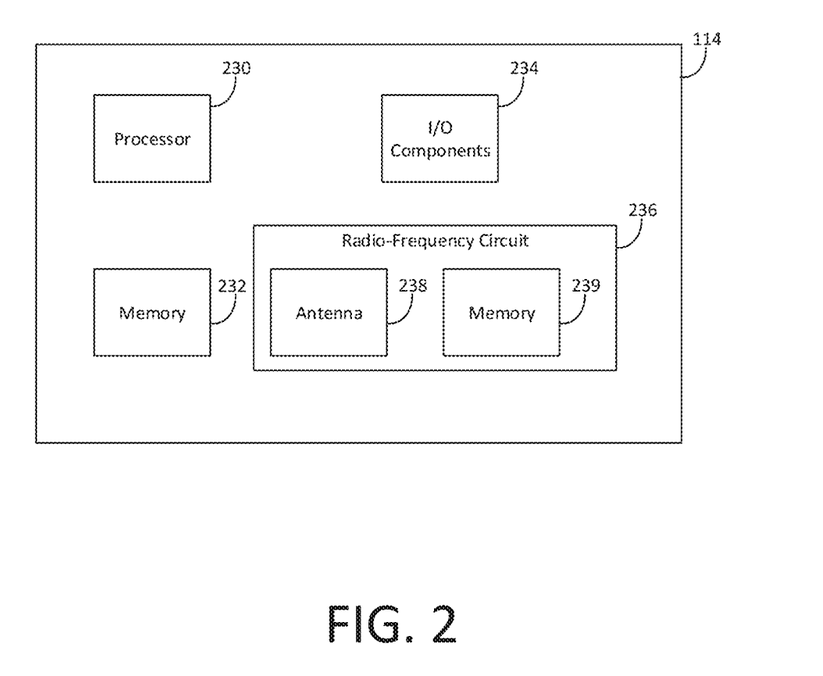
FIG. 2 is a diagram of an exemplary radio-frequency device.

FIG. 2 is a diagram of an exemplary RF device 114. RF device 114 may comprise one or more processors 230, one or more memories 232, input/output components 234, and one or more radio-frequency circuits 236. Radio-frequency circuit 236 may comprise a memory (e.g., a non-volatile memory 239). Radio-frequency circuit 236 may comprise one or more antennas 238. Input/output components 234 may comprise a camera or other optical device. Input/output components 234 may comprise a touchscreen display and/or trigger for initiating the reception or transmission of data. Input/output components 234 may permit the operation or configuration of RF device 114 by a user. Input/output components 234 may comprise a wireless network interface, serial bus connector, and/or modem. Radio-frequency circuit 236 may be a circuit configured to receive and/or transmit data over a wireless-communication protocol such as a UHF RFID protocol or an NFC protocol. Radio-frequency circuit 236 may comprise an RFID integrated circuit (e.g., an RFID chip). The RFID integrated circuit may comprise one or more memories (e.g., a non-volatile memory) in which configuration data 122 may be stored. Radio-frequency circuit 236 may be a passive RFID tag. Instead or in addition, configuration data 122 may be stored in memory 232. Memory 232 may be non-volatile. In some embodiments, RF device 114 may be a powered device (e.g., with a battery and/or with magnetic induction).

Memory 232 may be a disk drive, flash drive, memory circuitry, or other memory device. Memory 232 may store instructions that may include computer programs, firmware, or some other form of machine-readable instructions, including an operating system, utilities, drivers, network interfaces, applications, or some other type of software. Processor 230 may include other components such as a power management unit, a control interface unit, etc., which are omitted for clarity. Memory 232 may store a UPS identifier (e.g., a serial number).

Components of RF device 114 may be communicatively coupled and/or electrically connected to each other.

Figure 3:
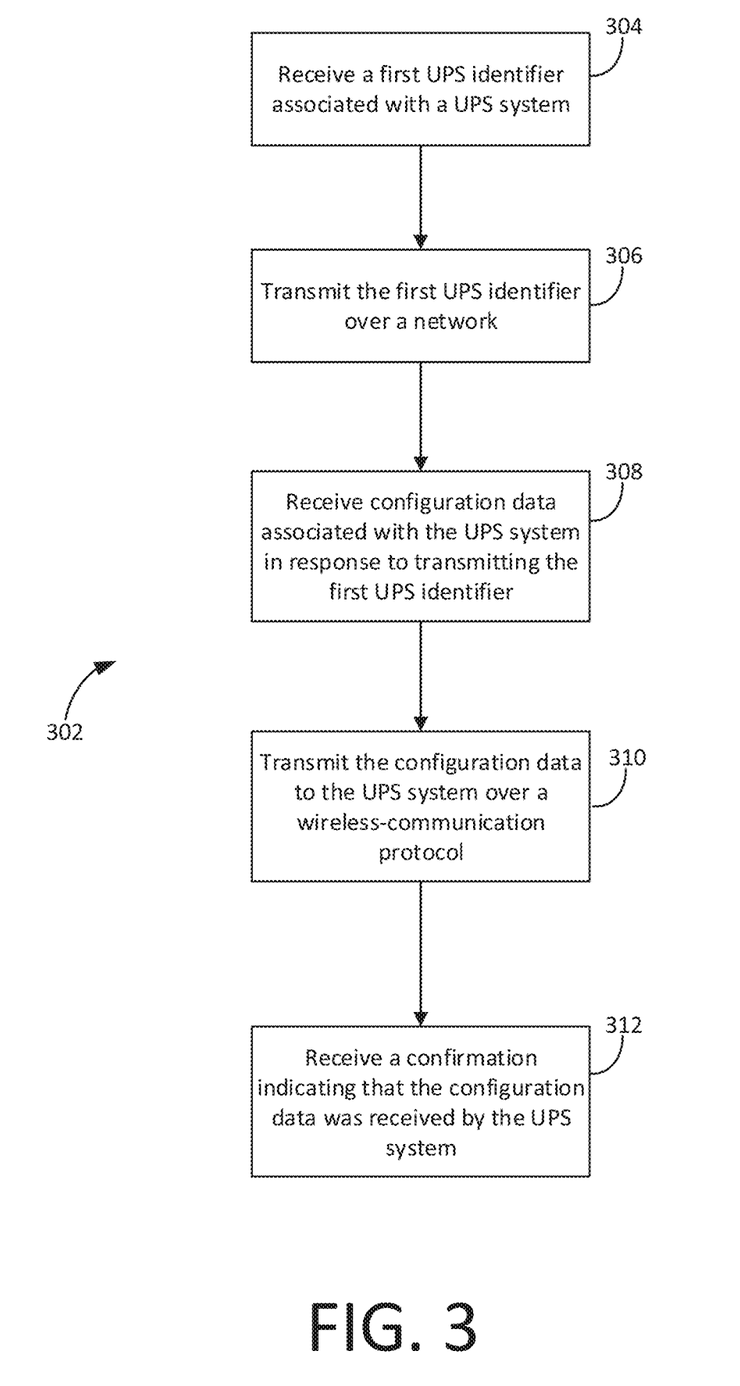
FIG. 3 is a flow chart illustrating an exemplary method for wirelessly configuring operational parameters of an Uninterruptible Power Supply.

FIG. 3 is a flow chart illustrating an exemplary method 302 for wirelessly configuring operational parameters of a UPS. One or more steps of method 302 may be performed using RF device 114. One or more steps of method 302 may be performed by computer system 128. Method 302 may include, at step 304, receiving a first UPS identifier associated with UPS 104 (e.g., a serial number). The first UPS identifier may be received after scanning barcode 116 on UPS 104 or its packaging. In some embodiments, the first UPS identifier may be stored in a memory of UPS 104 (e.g., during manufacturing) and may be transmitted by UPS 104 when wirelessly powered by RF device 114 (e.g., using electromagnetic induction). Method 302 may further include, at step 306, transmitting the first UPS identifier over network 118. RF device 114 may transmit the first UPS identifier to computer system 128, server 120, or database 124. In some embodiments, this transmission may occur via direct connection and bypass network 118. In some embodiments, instead of or in addition to transmitting the first UPS identifier, RF device 114 may transmit other data used to retrieve configuration data 122. Method 302 may further include, at step 308, receiving configuration data 122 associated with UPS 104 in response to transmitting the first UPS identifier. Configuration data 122 may be received from database 124, server 120, or computer system 128. Method 302 may further include, at step 310, transmitting configuration data 122 to UPS 104 over a wireless-communication protocol (e.g., a UHF RFID protocol or an NFC protocol). In some embodiments, method 302 may further include, at optional step 312, receiving a confirmation indicating that configuration data 122 was received by UPS 104. The confirmation may be transmitted by UPS 104 in response to receiving configuration data 122. In some embodiments, RF device 114 may have configuration data for multiple UPS systems stored on it. In this case, RF device 114 may not retrieve configuration data 122 after receiving the first UPS identifier.

Figure 4:
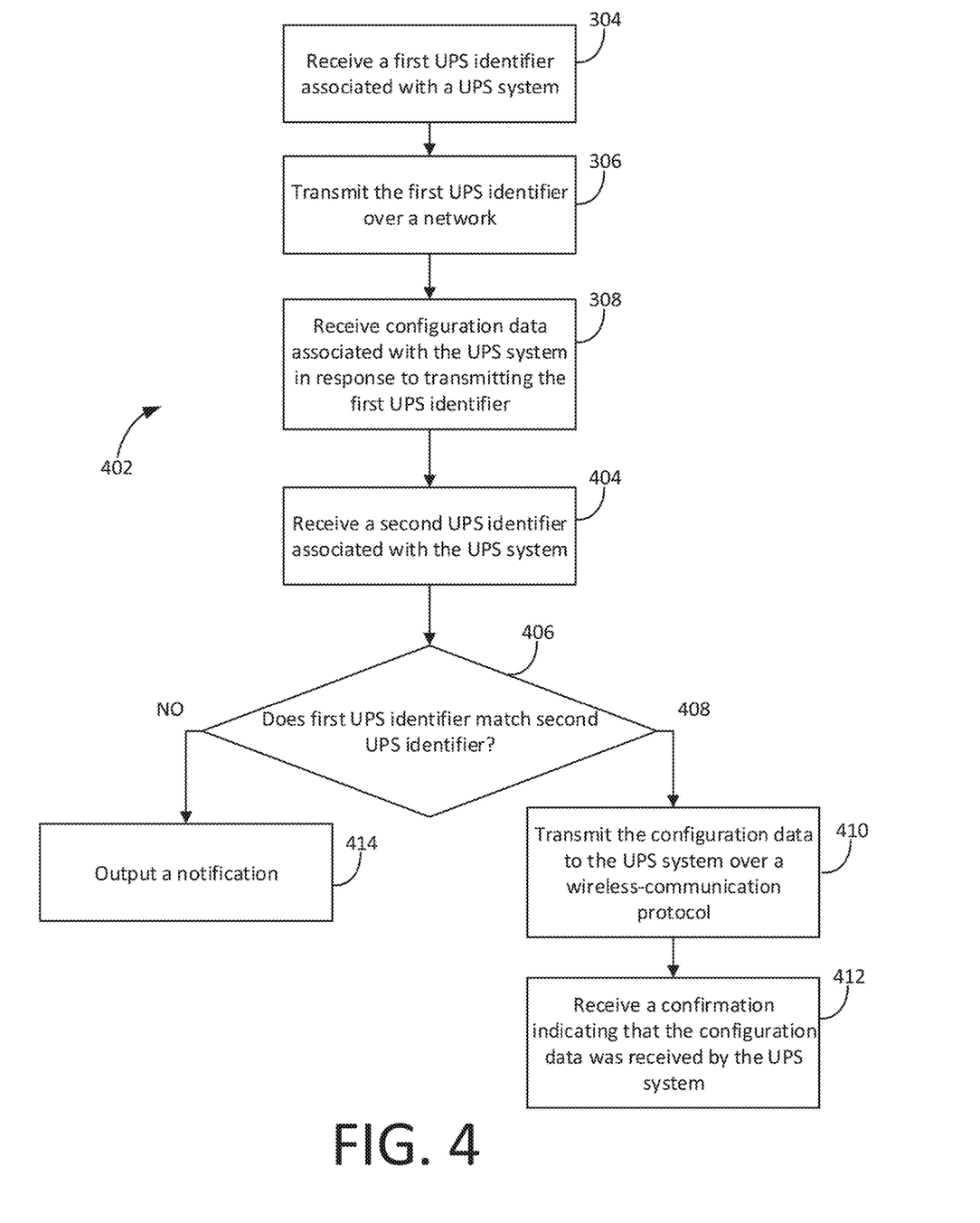
FIG. 4 is a flow chart illustrating another exemplary method for wirelessly configuring operational parameters of an Uninterruptible Power Supply.

FIG. 4 is a flow chart illustrating an exemplary method 402 for wirelessly configuring operational parameters of an Uninterruptible Power Supply. One or more steps of method 402 may be performed by RF device 114. One or more steps of method 402 may be performed by computer system 128. Method 402 may include step 304 through step 308 of method 302. Method 402 may include, at step 404, receiving a second UPS identifier associated with UPS 104. The second UPS identifier may be received in response to scanning a barcode on a UPS into which the distributor will write configuration data 122, believing the UPS to be UPS 104. Method 402 may include, at step 406, determining whether the first UPS identifier matches the second UPS identifier. For example, the serial number received with a scan before configuration data 122 was retrieved may be compared to the serial number received in response to a second scan after configuration data 122 was retrieved but before configuration data 122 is transmitted to the UPS believed to be UPS 104. Method 402 may include, at step 408, transmitting configuration data 122 to UPS 104 over a wireless-communication protocol if a match is detected at step 406. In some embodiments, method 402 may include, at step 412, receiving a confirmation indicating that configuration data 122 was received by UPS 104. Method 402 may include, at step 414, outputting a notification if a match was not detected at step 406. The notification may indicate, for example, that the UPS identifier associated with configuration data 122 does not match the UPS identifier stored on the UPS the distributor is going to configure. In some embodiments, method 402 may include an optional step of receiving a notification if a match is detected at step 406.

Figure 5:
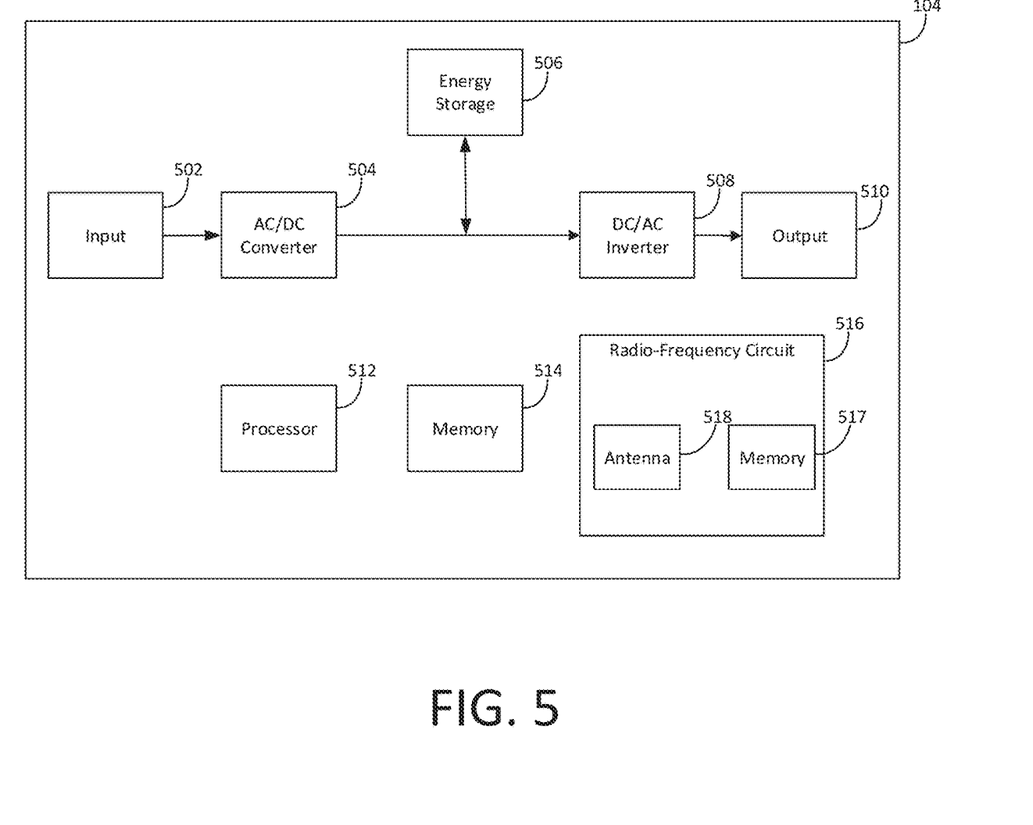
FIG. 5 is a diagram of an exemplary Uninterruptible Power Supply.
Figure 5A:
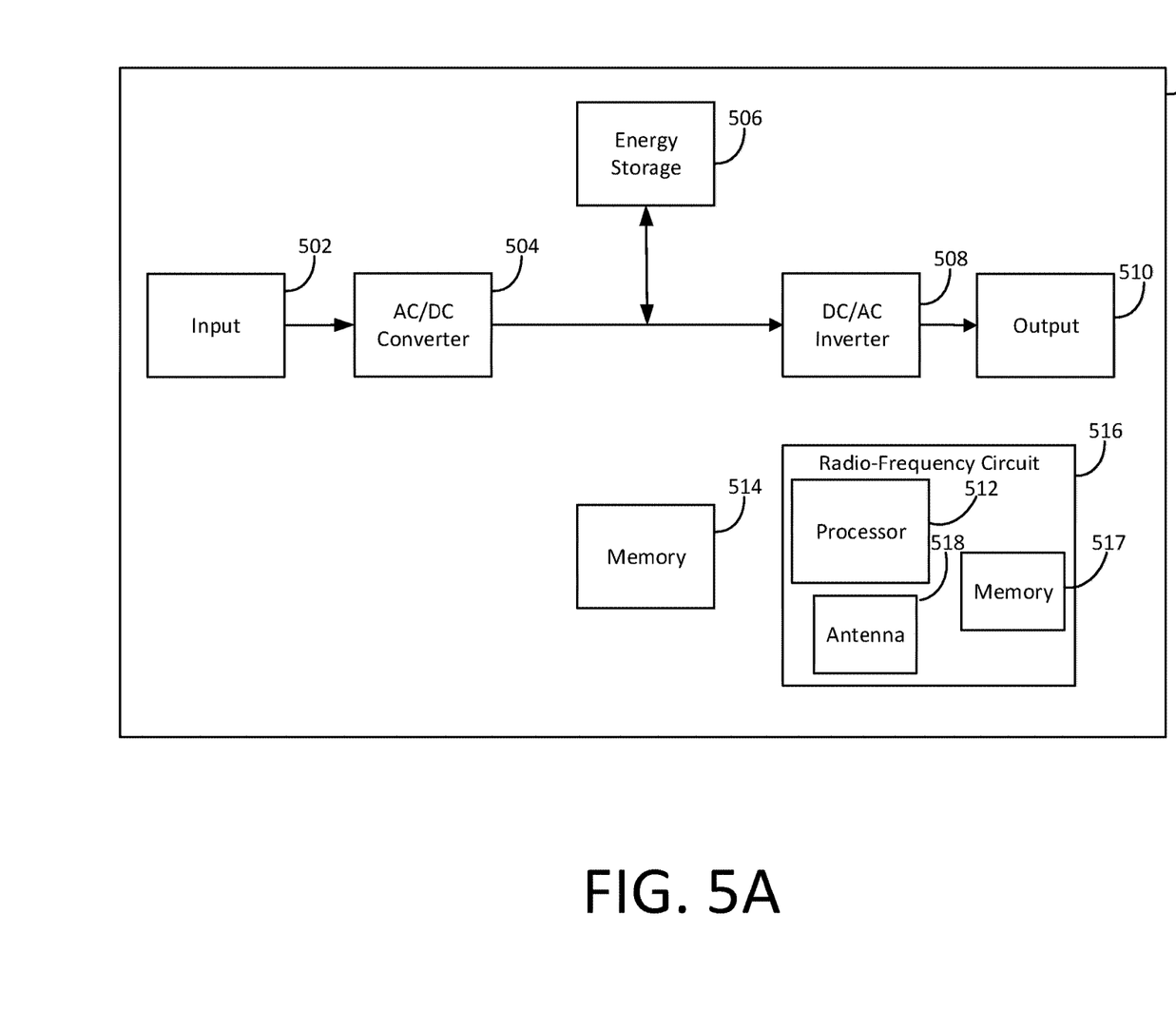
FIG. 5A is a diagram of another exemplary Uninterruptible Power Supply.

FIG. 5 is a diagram of an exemplary UPS 104. UPS 104 may comprise an input 502 coupled to an AC power source (not shown) to receive input AC power. UPS 104 may comprise an AC/DC converter 504 or another type of converter circuit coupled to input 502. AC/DC converter 504 may be configured to convert an input AC voltage to a DC voltage. UPS 104 may comprise an energy-storage component 506. Energy-storage component 506 may be, for example, a battery. In some embodiments, UPS 104 may comprise a DC/AC inverter 508 that converts DC voltage to AC voltage. In some embodiments, UPS 104 may not use a DC/AC inverter 508 to process the energy before it is outputted. UPS 104 may comprise a load output 510 configured to provide output power to a load (not shown) derived from the DC voltage. UPS 104 may comprise one or more processors 512 (e.g., a System Level Controller) and one or more memories 514 storing instructions that, when executed by processor 512, cause processor 512 to perform a method for configuring operational parameters of UPS 104. Operational parameters may be stored in memory 514 or another memory. Operational parameters may be values or other data specifying how UPS 104 is to operate. UPS 104 may comprise a radio-frequency circuit 516 configured to receive a radio-frequency signal. Radio-frequency circuit 516 may comprise an antenna 518. Radio-frequency circuit 516 may be a circuit configured to receive and/or transmit data over a wireless-communication protocol such as a UHF RFID protocol or an NFC protocol. Radio-frequency circuit 516 may comprise a memory (e.g., a non-volatile memory 517). Radio-frequency circuit 516 may comprise an RFID integrated circuit (e.g., an RFID chip). Radio-frequency circuit 516 may be a passive RFID tag. The RFID integrated circuit may comprise a memory (e.g., a non-volatile memory) in which configuration data 122 may be stored. Instead or in addition, configuration data 122 may be stored in memory 514. Configuration data 122 may be stored in the non-volatile memory at least until it is read when UPS 104 is powered by the user. This non-volatile memory may be a passive data storage component. In some embodiments, processor 512 may be a part of radio-frequency circuit 516. In some embodiments, memory 514 may be a part of radio-frequency circuit 516 as shown in FIG. 5A. In some embodiments, processor 512 and/or memory 514 may receive power from antenna 518 or another component configured to receive energy over electromagnetic induction. Memory 514 may be non-volatile.

Components of UPS 104 may be communicatively coupled and/or electrically connected to each other.

Figure 6:
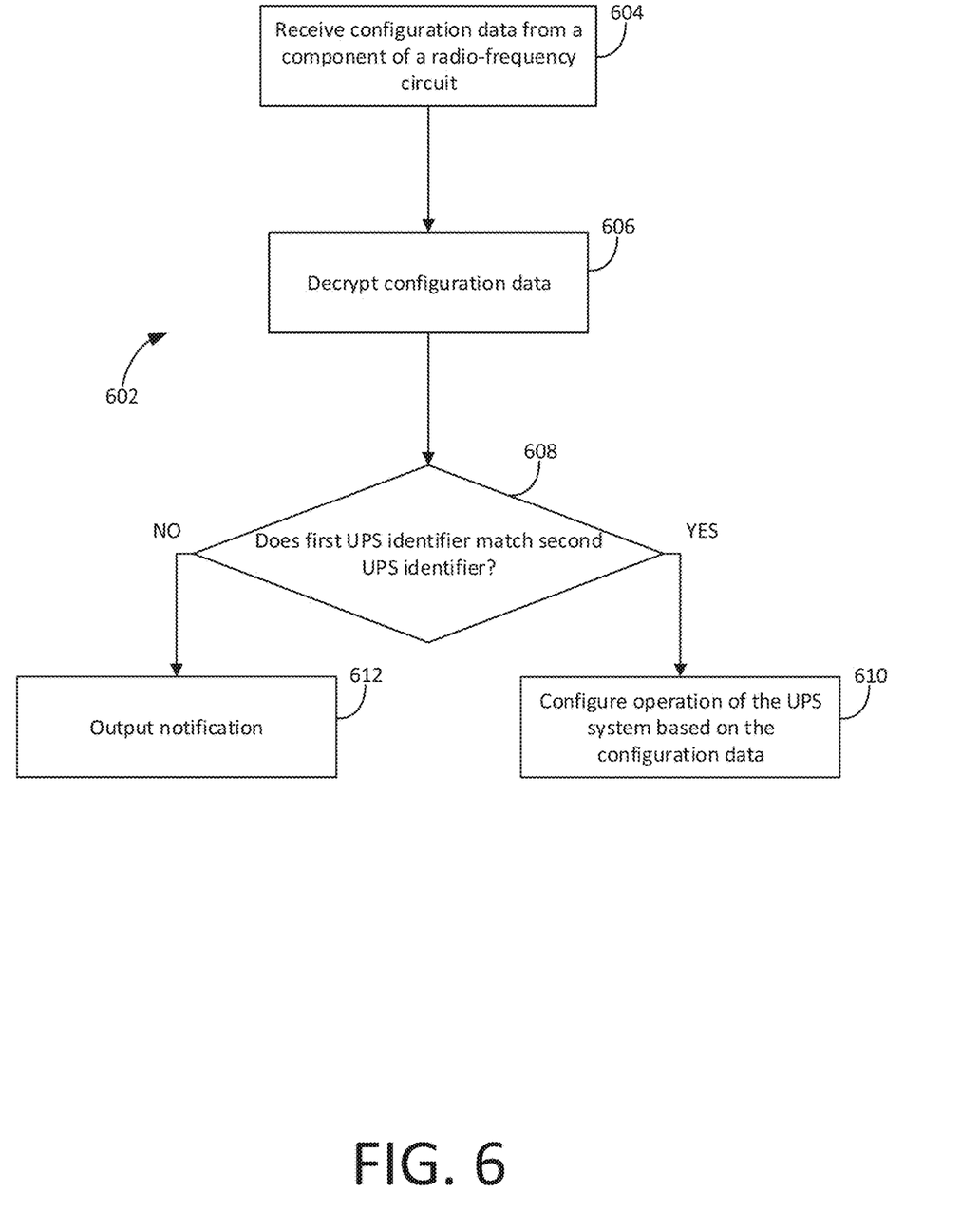
FIG. 6 is a flow chart illustrating an exemplary method for configuring operational parameters of an Uninterruptible Power Supply.

FIG. 6 is a flow chart illustrating an exemplary method 602 for configuring operational parameters of an Uninterruptible Power Supply. One or more steps of method 602 may be performed using UPS 104. Method 602 may include, at step 604, receiving configuration data 122 from a component of radio-frequency circuit 516 or another component. For example, processor 512 may receive configuration data 122 from antenna 518. In some embodiments, the method may include, at optional step 606, decrypting configuration data 122. The decryption may be performed, for example, using methods discussed with respect to FIG. 1. Method 602 may further include, at step 608, determining whether a first UPS identifier matches a second UPS identifier. The first UPS identifier may be a portion of configuration data 122 received from RF device 114. The first UPS identifier may be a serial number of a UPS for which configuration data 122 was intended. The second UPS identifier may be stored on UPS 104. For example, the second UPS identifier may be a serial number stored in memory 514 of UPS 104 at the time of manufacturing. The second UPS identifier may be stored in another storage, which may be a read-only memory. Method 602 may further include, at step 610, configuring operation of the UPS 104 based on configuration data 122 if a match was detected at step 608 if a mismatch is detected. Method 610 may further include, at step 612, outputting a notification indicating that the first UPS identifier did not match the second UPS identifier at step 608. Method 602 may include an optional step of outputting a notification indicating that the first UPS identifier matched the second UPS identifier at step 608.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer and comprises computer storage media and communication media. By way of example, and not limitation, computer storage media include both volatile and nonvolatile, removable and non-removable media implemented in any method or technology for storage of information such as computer-readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired non-transitory information in the form of computer-executable instructions or data structures and that can be accessed by a computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general-purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes computer storage media, including nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as a video adapter. In addition to the monitor, personal computers typically include other peripheral output devices (not shown), such as speakers and printers.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), microcontrollers, and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Embodiments of the disclosure may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements. Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An Uninterruptible Power Supply (UPS) system, comprising:
    a processor;
    an input coupled to an AC power source to receive input AC power;
    a converter circuit coupled to the input and configured to convert an input AC voltage to a DC voltage;
    an energy-storage component;
    a load output configured to provide output power derived from the DC voltage;
    a radio-frequency circuit configured to receive a radio-frequency signal, the radio-frequency circuit comprising an antenna; and
    a memory storing instructions that, when executed by the processor, cause the processor to:
        receive configuration data from a component of the radio-frequency circuit, the configuration data comprising a first UPS identifier,
        compare the first UPS identifier to a second UPS identifier, the second UPS identifier stored on a memory of the UPS system, and
        configure operation of the UPS system based on the configuration data.

2. The UPS system of claim 1, wherein the processor configures operation of the UPS system based on the configuration data in response to the comparison of the first UPS identifier to a second UPS identifier resulting in a match.

3. The UPS system of claim 1, wherein comparing the first UPS identifier to the second UPS identifier comprises decrypting the configuration data.

4. The UPS system of claim 1, wherein the first UPS identifier is a first serial number and the second UPS identifier is a second serial number.

5. The UPS system of claim 1, wherein the antenna is configured to receive the configuration data over an Ultra High Frequency Radio Frequency Identification communication protocol.

6. The UPS system of claim 1, wherein the radio-frequency circuit comprises a passive data storage.

7. The UPS system of claim 1, wherein the radio-frequency circuit comprises the processor.

8. The UPS system of claim 1, wherein the radio-frequency circuit comprises the memory.

9. A non-transitory computer-readable medium storing a set of instructions that are executed by at least one processor to perform a method for configuring operational parameters of an Uninterruptible Power Supply (UPS), the method comprising:
   receiving configuration data from a component of a radio-frequency circuit in a UPS, wherein the radio-frequency circuit is configured to receive a radio-frequency signal and the configuration data comprises a first UPS identifier;
   comparing the first UPS identifier to a second UPS identifier, the second UPS identifier stored on a memory of a UPS system; and
   configuring operation of the UPS system based on the configuration data.

10. The non-transitory computer-readable medium of claim 9, wherein the method further comprises configuring operation of the UPS system based on the configuration data in response to the comparison of the first UPS identifier to a second UPS identifier resulting in a match.

11. The non-transitory computer-readable medium of claim 9, wherein comparing the first UPS identifier to the second UPS identifier comprises decrypting the configuration data.

12. The non-transitory computer-readable medium of claim 9, wherein the first UPS identifier is a first serial number and the second UPS identifier is a second serial number.

13. The non-transitory computer-readable medium of claim 9, wherein the radio-frequency circuit comprises a passive data storage.

14. The non-transitory computer-readable medium of claim 9, wherein the radio-frequency circuit comprises the at least one processor.

15. The non-transitory computer-readable medium of claim 9, wherein the radio-frequency circuit comprises the non-transitory computer-readable medium.

16. A non-transitory computer-readable medium storing a set of instructions that are executed by at least one processor to perform a method for wirelessly configuring operational parameters of an Uninterruptible Power Supply (UPS), the method comprising:
   receiving, on a radio-frequency device, a first UPS identifier associated with a UPS system;
   transmitting the first UPS identifier over a network;
   receiving configuration data associated with the UPS system in response to transmitting the first UPS identifier, the configuration data specifying one or more operational parameters of the UPS system;
   transmitting the configuration data to the UPS system over a wireless-communication protocol;
   receiving, on the radio-frequency device, a second UPS identifier associated with the UPS system;
   comparing the first UPS identifier with the second UPS identifier; and
   outputting a notification if the comparison does not result in a match.

17. A non-transitory computer-readable medium storing a set of instructions that are executed by at least one processor to perform a method for wirelessly configuring operational parameters of an Uninterruptible Power Supply (UPS), the method comprising:
   receiving, on a radio-frequency device, a first UPS identifier associated with a UPS system;
   transmitting the first UPS identifier over a network;
   receiving configuration data associated with the UPS system in response to transmitting the first UPS identifier, the configuration data specifying one or more operational parameters of the UPS system;
   transmitting the configuration data to the UPS system over a wireless-communication protocol; and
   receiving a confirmation from the UPS system indicating that a second UPS identifier transmitted as a portion of the configuration matches a third UPS identifier stored on a memory of the UPS system.

* * * * *